United States Patent [19]

Bailey et al.

[11] 4,396,409
[45] Aug. 2, 1983

[54] METHOD OF IMPROVING FATIGUE RESISTANCE OF OPTICAL FIBERS

[75] Inventors: Alan C. Bailey; Robert D. Maurer, both of Painted Post, N.Y.

[73] Assignee: Corning Glass Works, Corning, N.Y.

[21] Appl. No.: 329,816

[22] Filed: Dec. 11, 1981

[51] Int. Cl.³ .................... C03B 37/025; C03B 37/07
[52] U.S. Cl. ........................................ 65/3.11; 65/12; 65/13
[58] Field of Search ............... 65/2, 3.1, 3.11, 12, 65/13, 104

[56] References Cited

U.S. PATENT DOCUMENTS

| | | | |
|---|---|---|---|
| 1,438,428 | 12/1922 | Dhe | 65/2 |
| 3,589,878 | 6/1971 | Achener | 65/33 X |
| 3,782,914 | 1/1974 | DeLuca et al. | 65/3.12 |
| 3,788,827 | 1/1974 | DeLuca | 65/3.12 X |
| 3,881,945 | 5/1975 | Trojer et al. | 65/2 X |
| 4,199,336 | 4/1980 | Rittler | 65/2 |
| 4,249,925 | 2/1981 | Kawashima et al. | 65/13 X |
| 4,304,582 | 12/1981 | Aussenegg et al. | 65/2 X |
| 4,309,201 | 1/1982 | Klop et al. | 65/2 |

OTHER PUBLICATIONS

R. Hiskes, "Improved Fatigue Resistance of . . . Optical Fibers" Tech. Digest Conf. on Optical Fiber Communication, Mar. 1979, Washington, D.C.

Primary Examiner—Richard V. Fisher
Attorney, Agent, or Firm—W. J. Simmons, Jr.

[57] ABSTRACT

Disclosed are a method and apparatus for improving the fatigue characteristics of a glass optical waveguide fiber. After the fiber is drawn and before it is provided with a protective coating it is heated to a temperature within the annealing temperature range. A filtered gas may be flowed over the fiber during the step of heating.

3 Claims, 4 Drawing Figures

METHOD OF IMPROVING FATIGUE RESISTANCE OF OPTICAL FIBERS

BACKGROUND OF THE INVENTION

1. Field of the Invention

This invention relates to optical waveguide fibers, and more particularly, to the improvement of the fatigue characteristics of such fibers.

Static fatigue failure in an optical fiber manifests itself as a deteriorating load-carrying capability under a constant axial stress in a humid atmosphere. Glass has a known propensity to weaken with time and under conditions of mechanical stress because of water reaction at the tip of surface flaws. In the manufacture, installation and servicing of a glass optical fiber cable, the fibers experience unavoidable short-term and long-term stresses. Short-term stresses arise from pulling and handling the fibers during manufacturing and installation, or from accidentally applying severe curvatures or impacts. Long-term stresses arise from suspending a cable between supports, from residual stresses due to cabling, and from reeling tension when the cable is taken up and stored. The glass fibers in an optical fiber cable must of course be capable of withstanding such stresses.

The wide variation in the strength of glass is due to the existence of surface flaws. Depending on the prior processing history, surface flaws can range from atomic discontinuities to macroscopic cracks. For an optical fiber, the more surface flaw damage it incurs, the lower will be its tensile strength, and the more likely it is to fail completely under tensile stress.

Glass optical fibers subjected to long-term stress can fracture in a delayed fashion, even though the stress can be withstood for a short time. A method which provides the physical basis for extrapolating laboratory data to multi-kilometer lengths and long lifetimes is discussed in the publication by R. Olshansky and R. D. Maurer entitled "Tensile Strength and Fatigue of Optical Fibers" Journal of Applied Physics, Vol. 47, No. 10, October 1976, pp. 4497–4499. In accordance with this publication the growth in flaw size from water attacking the strained glass bonds at the flaw tip is described by an empirical law $$(d\delta/dt) = (AY\delta^{\frac{1}{2}}\sigma)^n \quad (1)$$

where $\delta$ is the flaw depth, $Y \sim \sqrt{\pi}$, $\sigma$ is the applied stress, and A and n are empirical constants. Equation (1) is dominated by n which is about 20 for conventional fibers under normal humidity. It is noted that the value of n depends upon the measurement technique employed. Since all of the data disclosed herein was obtained by the same measurement technique, valid comparisons can be made between the measured n values of the various fibers that were tested. The constant, n expresses the stress dependence of fatigue and hence is often used to compare fatigue susceptibility in different cases. Larger values of n indicate better resistance to fatigue. When the stress increases linearly with time, $\sigma = Rt$, equation (1) predicts that the same flaw will fracture under different loading stress according to $$(\sigma_1/\sigma_2)^n \cong R_1/R_2. \quad (2)$$

This leads to the conclusion that a flaw distribution fractured at two different loading rates will give two different strength distributions in constant strength ratio to one another. The relationship expressed in equation (2) was used in the manner described hereinbelow to experimentally determine the fatigue constant n of fibers treated in accordance with the method of the present invention.

2. Prior Art Optical Fiber Strengthening Techniques

It is already known to manufacture optical fibers which are coated during manufacturing with plastic material which adds its own tensile strength to that of the fiber and also protects the fiber from external damage. Also known are methods of protecting the fiber itself from static fatigue failure. United States Defensive Publication No. T958,010 teaches that glass optical fibers can be protected by an initial coating that reacts with surface silanol groups, thereby occupying or tying up water vapor reaction sites. The OH surface radicals may be bonded to by condensation reactions including: esterification, carboxylation, etherification, chlorination and ammination.

Conventional plastic coatings are nearly worthless in retarding the diffusion of water from the atmosphere to the glass surface. Among the most successful coatings that act as hermetic seals are thick metallic coatings. However, the effectiveness of such coatings is dimensioned because bending of the fiber produces plastic flow in the metal which, in turn, causes microbending attenuation in the fiber.

Another known method of increasing the strength of glass optical fibers is to provide surface compression at the cladding surface. Such a technique is discussed, for example, in an article in the Journal of the American Ceramic Society, December 1969, pages 661–664, by D. A. Krohn et al. This article presents theoretical and experimental data to show that, if the cladding glass is selected to have a lower coefficient of thermal expansion than that of the core glass, and if proper attention is paid to glass transition temperatures of the core and cladding, there is a good probability that compressive stresses can be developed to improve fiber strength.

3. Prior Art Optical Fiber Heating Techniques

U.S. Pat. No. 3,711,262 teaches one of the first known techniques for forming low loss optical waveguide fibers, i.e., fibers having losses less than 20 dB/km. Such waveguides included a core of silica doped with an oxide such as titania. It was found that the dopant became chemically reduced during fabrication which included the step of drawing the fiber at a high temperature. For example, titanium dioxide has $Ti^{+4}$ ions which are reduced to $Ti^{+3}$ ions during fabrication. These reduced ions increased the attenuation of the fiber. U.S. Pat. No. 3,782,914 teaches a method of reducing the attenuation of such a fiber by heat treating the fiber at a temperature in the range of approximately 800°–1000° C. whereby the reduced multivalent ion is oxidized with hydroxyl ions deliberately retained in the glass and which serve as the oxidizing agent. It has since been discovered that hydroxyl ions increase the attenuation of optical waveguide fibers at certain wavelengths, and optical fibers are now formed with as low a OH content as possible. Optical waveguide fiber preforms formed by the so-called inside vapor deposition and both lateral and axial outside vapor deposition techniques are capable of forming fibers the hydroxyl ion content of which is less than 100 ppm.

Furthermore, although post-drawing heat treatments resulted in fibers having low absorption losses, such heat treatments also had the detrimental effect of weakening the fibers. As taught in U.S. Pat. No. 3,788,827, the fiber had to be subjected to surface cleaning technique such as bombarding the surface with ions having sufficient energy to remove a surface layer from the fiber. Thereafter, the fiber was heat treated before the surface could become recontaminated in order to change the oxidation state of the dopant oxide, thereby reducing the light absorption properties thereof. In accordance with the teachings of U.S. Pat. No. 3,788,827, the fiber having a portion of the surface removed was stored on a reel in a chamber to which there was connected a source of oxygen which was required for the heat treatment. After a sufficient amount of fiber was stored, heating means was activated for a period of time sufficient to oxidize impurities in the fiber and improve the light transmission properties thereof to an acceptable level.

SUMMARY OF THE INVENTION

An object of the present invention is to improve the fatigue resistance of an optical waveguide fiber prior to the time that the final protective coating is applied thereto.

Briefly, the invention pertains to a method of drawing from a source of molten non-devitrifiable glass a fiber having a core and an outer cladding layer. In accordance with this invention, the drawn fiber is heated to a temperature within the annealing temperature range to improve the fatigue characteristics thereof without devitrifying the core or cladding glass. This can be accomplished by locating an elongated annealing furnace between the draw furnace and the fiber pulling means. If a coating is to be applied to the fiber, it is applied after the fiber passes through the annealing furnace.

DESCRIPTION OF THE PREFERRED EMBODIMENT

Figure 1:
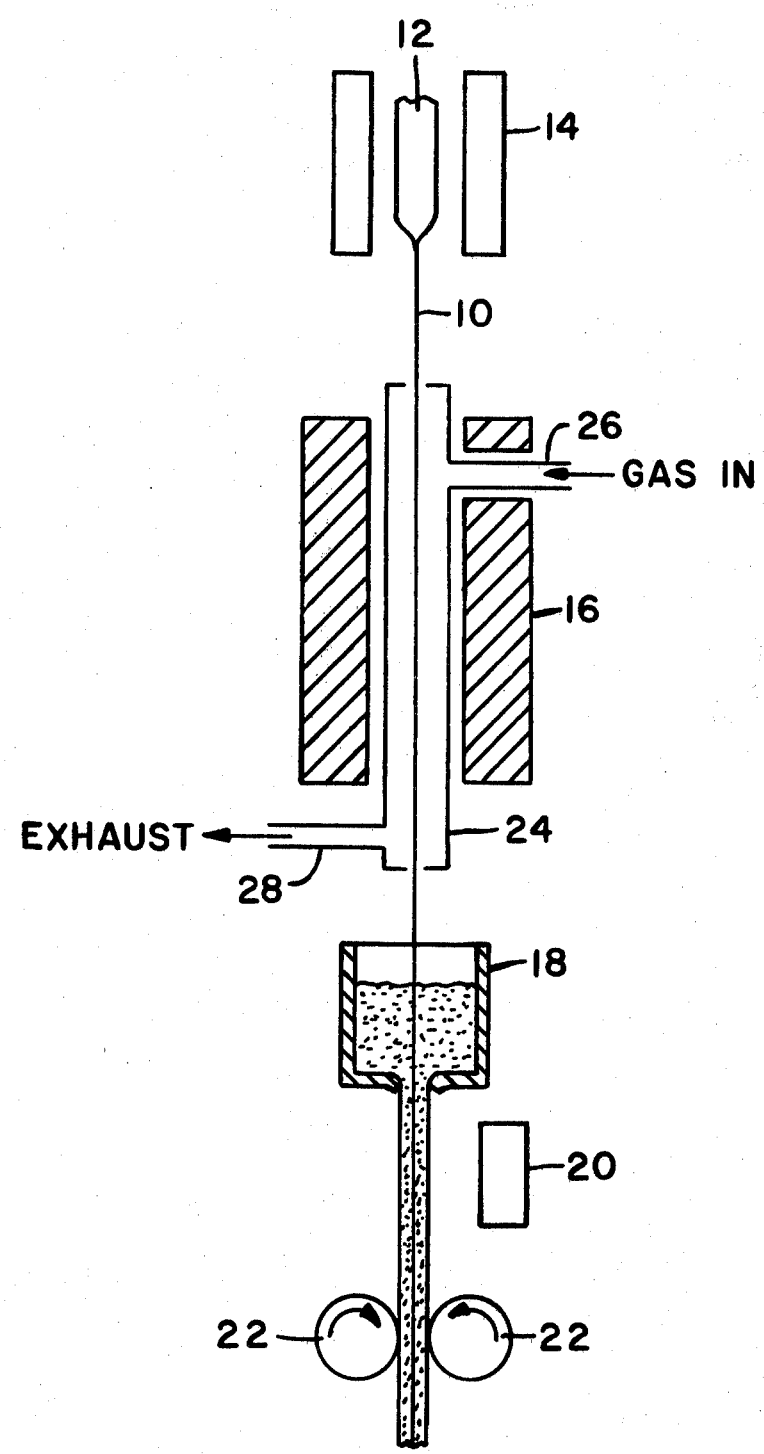
FIG. 1 is a schematic illustration, with certain elements in cross-section, of an apparatus for carrying out the process of the invention.

The method of the present invention can be carried out by the apparatus illustrated in FIG. 1. Fiber 10 is drawn from blank 12 which is located in draw furnace 14. If fiber 10 is an optical waveguide, the light conducting region thereof should have an extremely low water content. Indeed, even the cladding region should have a hydroxyl ion content less than 100 ppm. Fiber 10 extends through annealing furnace 16 and coater 18 and is engaged by pulling tractors 22. Means such as an ultraviolet light source 20 may be employed to cure the coating material. Within furnace 16 is located an elongated tubular chamber 24 having an inlet pipe 26 and an outlet pipe 28. To test the effect of different gases on the fiber, filtered air or nitrogen was flowed into pipe 26 during fiber heat treatment. Since no difference in results occured, chamber 24 could be omitted and air could be permitted to flow naturally through furnace 16. Air filtered to remove particulate material should result in stronger fibers. Furnace 16 should be maintained at a temperature within the annealing temperature range of the glass fiber being drawn. If a clad optical fiber is being drawn, furnace 16 must be maintained at a temperature within the annealing temperature range of the cladding glass. The annealing temperature range for high silica content fibers is between 900° C. and 1300° C.

The fatigue constant n was obtained for a plurality of fibers which were heat treated in an apparatus of the type shown in FIG. 1. For fibers A through L, blank 12 was formed by a flame hydrolysis technique of the type disclosed in U.S. Pat. No. 4,125,388 (Powers). Fiber 10 comprised a 50 μm diameter core of $GeO_2$-doped $SiO_2$ surrounded by a layer of $SiO_2$ having an outside diameter of 125 μm. Both furnaces 14 and 16 were resistance furnaces. The top of furnace 16 was about 51 cm below furnace 14. Furnace 16 was 25 cm long, and it was operated at a temperature in the range of 1000°–1100° C. for all fibers reported in Table 1 except fiber B for which the temperature was somewhat under 1000° C.

In coater 18 an ultraviolet light curable acrylate coating material sold under the designation DESOLITE #23 was used for fibers A and B of Table 1, and a similar material sold under the designation DESOLITE #37 was used for fibers C through L. DESOLITE #23 and DESOLITE #37 are coating materials manufactured by DeSoto Inc., 1700 S. Mt. Prospect Road, Des Plaines, Illinois. A coating apparatus of the type disclosed in U.S. Pat. No. 4,294,190 (Ohls) was employed.

TABLE 1

| Fiber | Draw Speed m/sec. | Reactor Condition | Median Break Load ksi | Weibull m | Weibull Intercept | Sample N | Fatigue Constant n |
|---|---|---|---|---|---|---|---|
| A | 0.127 | COLD | 766.0 | 2.08 | −5.94 | 20 | 17.8 |
|   |   |   | 492.6 | 2.21 | −6.02 | 20 |   |
| B | " | HOT | 295 | 4.88 | −12.12 | 27 | 23.2 |
|   |   | AIR | 242 | 7.35 | −17.72 | 23 |   |
| C | 0.076 | HOT | 114.1 | 2.23 | −4.81 | 14 | 15.1 |
|   |   | AIR | 83.6 | 3.43 | −6.86 | 9 |   |
| D | " | HOT | 122.5 | 2.46 | −5.28 | 18 | 16.4 |
|   |   | $N_2$ | 92.5 | 3.58 | −7.34 | 17 |   |
| E | " | HOT | 109.9 | 4.08 | −8.53 | 15 | 15.1 |
|   |   | AIR | 81 | 2.22 | −4.46 | 16 |   |
| F | " | HOT | 91 | 5.65 | −11.44 | 19 | 27.5 |
|   |   | $N_2$ | 77 | 4.05 | −7.88 | 18 |   |
| G | " | HOT | 95.3* | 2.98 | −6.05 | 9 | 62 |
|   |   | AIR | 88.5* | 2.90 | −5.81 | 8 |   |
| H | " | HOT | 113.6 | 3.25 | −7.04 | 7 | 28.2 |
|   |   | AIR | 96.5 | 4.14 | −8.50 | 7 |   |
| I | " | HOT | 149.3* | 2.28 | −5.11 | 4 | 27.4 |
|   |   | AIR | 125.4 | 1.84 | −4.03 | 5 |   |
| J | " | HOT | 108.3 | 2.58 | −5.46 | 14 | −84 |
|   |   | AIR | 102.5 | 4.32 | −9.02 | 14 |   |
| K | " | HOT | 129* | 3.59 | −7.73 | 31 | 37 |
|   |   | AIR | 114* | 3.25 | −6.85 | 33 |   |
| L | " | HOT | 127 | 2.82 | −6.08 | 20 | 33 |
|   |   | AIR | 110 | 3.16 | −6.67 | 21 |   |
| M | 0.05 | COLD | 470* | 2.77 | −7.56 | 28 | 13.3 |
|   |   |   | 333* | 2.29 | −5.95 | 25 |   |

While fiber A was being drawn, the reactor remained cold in order to obtain a fatigue constant for untreated fiber. Another value of fatigue constant for untreated fiber is reported for fiber M. This fiber was drawn from an undried silica blank in a laser draw furnace. Fiber M was coated with a silastic coating material sold under the designation Dow Corning SYLGARD 184. The untreated fiber fatigue constant of 17.8 is in agreement with generally accepted values, the value of 13.3 being somewhat low. The fatigue constant n for fiber J was −84. Although the meaning of a negative n is not clear, if n is very large, say greater than 70, and either positive or negative, it should be regarded as representing no observable fatigue.

The sampling method used entailed removing fiber from a reel and alternating the test strain rates for sequential samples which were cut to 1.75 m lengths. The test equipment which was employed was of the type described in the publication by B. Justice and S. Gulati entitled "Tensile Tester for Long Optical Fibers", Ceramic Bulletin, Vol. 57, No. 2, (1978) pp. 217-219. This variable strain/stress rate tester is a rotating capstan device. The fibers are gripped by wrapping them around 5 cm diameter capstans, one of which has an internal torque cell for measuring the load. The other is rotated by a motor/gear reducer train. One meter of fiber extended between capstans. The load-time behavior was recorded on a digital storage oscilloscope.

Figure 2:
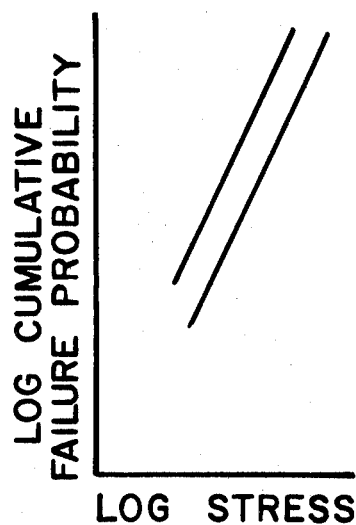
FIGS. 2 and 3 are Weibull dynamic fatigue plots.
Figure 3:
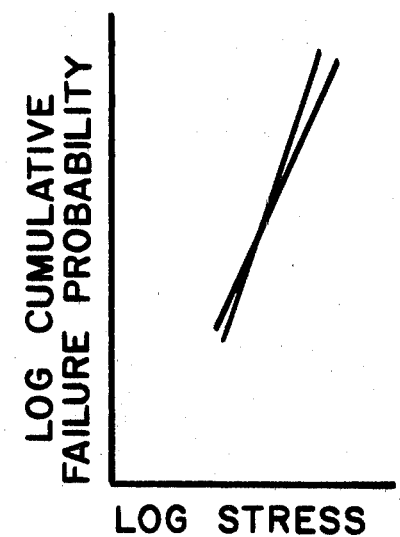

The tests were run at strain rates of 40% and 0.4% per minute. Under the heading "Median Break Load" in Table 1, the top number for each fiber pertains to the 40% per minute strain rate, and the lower number pertains to the 0.4% per minute strain rate. These data were fitted with the expected theoretical variation. For a Weibull plot, wherein the log of cummulative failure probability is plotted as a function of the log of the failure stress, the two sets of data should fit on parallel straight lines as illustrated in FIG. 2. When the plotted data resulted in two substantially parallel lines, these were formally analyzed in terms of linear regression. The shift in strength with strain rate was readily calculated from the two separate statistical fits. The median break load values of Table 1, which were obtained in this manner, are marked with an asterisk. The remaining median break load values are for fibers whose Weibull plot lines are widely different in slope as illustrated in FIG. 3. In such a case the shift in strength with strain rate was computed from the data medians. The number of samples tested for each fiber are listed under the heading "Sample N". The values of "Weibull m" and "Weibull Intercept" are also listed in the Table. The fatigue constant n was calculated from the relationship set forth in equation (2).

It is noted that the median break load strengths of annealed fibers are substantially lower than those of the untreated fibers. Due to the expansion of various parts in the annealing furnace 16 and chamber forming tube 24 when furnace 16 was turned on, the fiber contacted one or both of the end aperture-forming walls of chamber 24. The resultant scratching of the fiber lowered the strength thereof. This problem could be overcome by either removing chamber 24 or incorporating alignment equipment which would enable the fiber to pass through the chamber apertures untouched.

Figure 4:
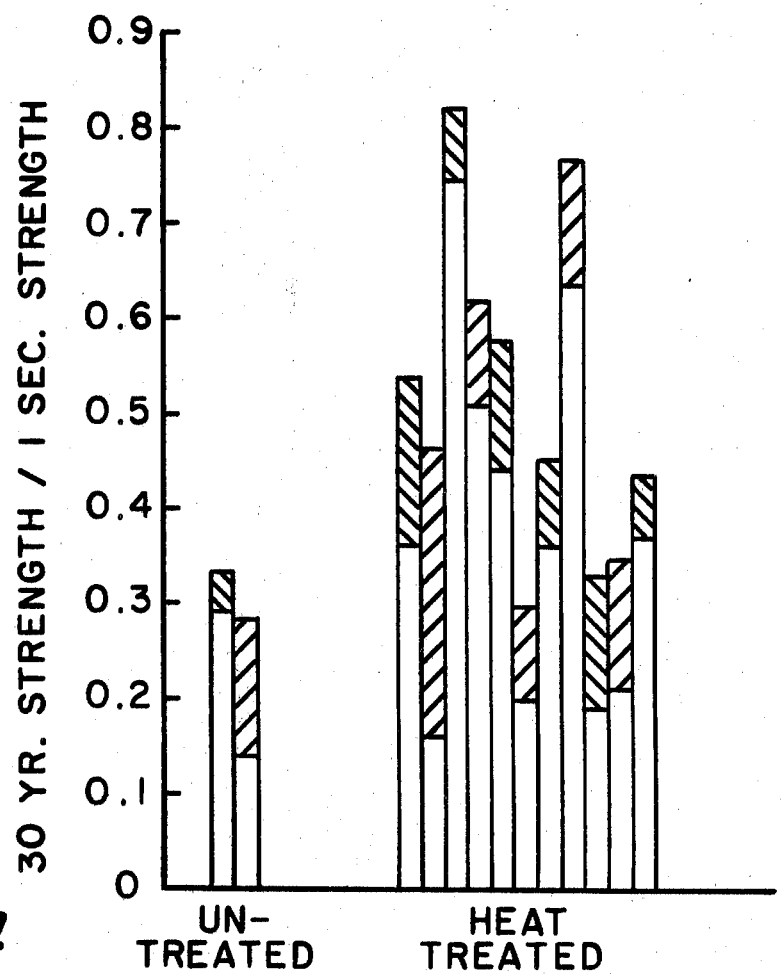
FIG. 4 is a bar graph comparing the ratio of 30 year strength to 1 second strength for untreated fibers and fibers treated in accordance with the method of the invention.

The average n-value for the fibers listed in the Table is 32.6. This is considerably above accepted values for an untreated fiber and represents an appreciable increase in fatigue resistance. FIG. 4 shows the data summary in terms of the ratio of the 30 year load to the one second load which the fiber could withstand. This ratio was computed from the following equation which follows from equation (1).

$$(\sigma_1/\sigma_2)^n = t_2/t_1 \tag{3}$$

The shaded portion of the bars represents ± two standard deviations. These deviations clearly indicate that the increased fatigue resistance is not due to imprecise data. The variations from run to run must be the result of experimental factors not yet under control.

We claim:

1. In the method of forming a low loss optical waveguide fiber comprising the steps of drawing from a source of molten non-devitrifiable glass a fiber having a core and an outer cladding layer, said fiber having a hydroxyl ion content less than 100 ppm, and applying a protective coating of plastic material to said fiber, the improvement comprising heating said fiber, while said fiber is being drawn and prior to applying a coating thereto, to a temperature within the annealing temperature range of the cladding glass to improve the fatigue characteristics of said fiber without devitrifying said core or cladding glass.

2. A method in accordance with claim 1 further comprising the step of flowing a filtered gas over said fiber during the step of heating.

3. A method in accordance with claim 2 wherein, during the step of heating said fiber, the temperature of said fiber is between 900° C. and 1300° C.

* * * * *